Jan. 17, 1950  L. A. GEISTERT  2,494,997
DISPLAY DOLLY
Filed Oct. 17, 1947  2 Sheets-Sheet 1

INVENTOR.
LEWIS A. GEISTERT
BY
Atty.

Jan. 17, 1950   L. A. GEISTERT   2,494,997
DISPLAY DOLLY
Filed Oct. 17, 1947   2 Sheets-Sheet 2

INVENTOR.
LEWIS A. GEISTERT

Patented Jan. 17, 1950

2,494,997

UNITED STATES PATENT OFFICE 2,494,997

DISPLAY DOLLY

Lewis A. Geistert, Grand Rapids, Mich., assignor to Simplex Display Fixture Company, Grand Rapids, Mich., a corporation of Michigan Application October 17, 1947, Serial No. 780,519

6 Claims. (Cl. 214—85)

This invention relates to display racks and more particularly to a display rack designed to act also as a truck or dolly and having a self contained loading ramp.

Although the idea of a series of supporting rollers mounted on a movable truck has been well known for many years, such dollies have had the disadvantage of either having a flat material supporting surface which does not hold the material against movement or they have been in the form of a V making them difficult to load.

Further, in the specialized field of handling floor covering material for display purposes, it is desirable that such dolly, while avoiding these named disadvantages, still permit the roll of material to rotate while being held thereon in order that such material may be conveniently transferred from such dolly to a roll-type display rack, of the type shown in connection with my copending application filed October 14, 1947, Serial No. 779,777 entitled Roller mounting for vertical dispenser filed concurrently herewith, without the necessity of lifting a roll bodily from the dolly to the rack.

I have overcome these difficulties by providing a display dolly having a V-shaped material support of which one side doubles as a loading ramp.

It is, therefore, a major object of my invention to provide a movable display dolly containing a loading ramp.

It is a further object of my invention to provide a dolly design which reduces to a minimum the amount of lifting necessary to load and unload it.

It is a further object of my invention to provide a dolly in which the loading ramp is carried by the supporting racks and, therefore, always ready for use when wanted.

It is a further object of my invention to provide such a dolly and racks thereon wherein the roll supporting portions are so arranged as to permit free rotation of such rolls while being supported by said dolly.

It is an additional object of my invention to provide a ramp which is both quick and simple to use.

Other objects and purposes of my invention will be apparent to persons acquainted with equipment of this type upon examination of the accompanying drawings and reading of the following disclosure.

Figure 1:
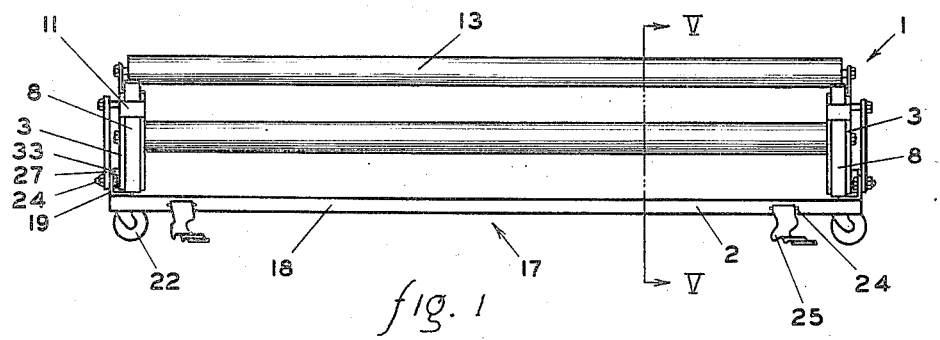
Figure 1 is a front elevational view of my invention.

In fulfilling the objects and purposes of my invention I have provided a series of free running rollers mounted in the shape of a V on a truck with at least one side of the V capable of being pivoted downwardly in cooperation with a pair of permanently carried, extensible handles to provide a loading ramp.

In the following description the terms "upward" and "downward" are used, and are to be taken as meaning, in relation to the invention as illustrated in the drawings. The further terms "inward" and "outward" are to be taken as meaning inwardly toward the geometric center of the dolly or outwardly away therefrom.

Figure 6:
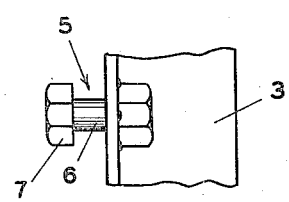
Figure 6 is an enlarged fragmentary view of my invention showing the support bosses for my roller mounts.

Referring to the drawings in detail the numeral 1 indicates a V-shaped material support assembly mounted on a truck frame 2. The material support assembly 1 consists of two pairs of inclined roller mounts 3 each pivotally mounted at one end 4 to the hereinafter described frame. The mounts are made from L-shaped steel channel section with the horizontal leg of each turned inwardly. A support boss 5 is provided near the opposite end of each roller mount 3. This boss projects outwardly from the mount and has a shank 6 and a head 7 which head is of greater diameter than the shank (Figure 6).

A spacer 33 is provided between said lower ends 4 and the vertical flange of the respective end members 19 hereinafter described.

A handle 8 having a straight portion 9 and a curved end 10 is slidably mounted to each end of at least one pair of roller mounts by the housing 11. The housing 11 encloses a rectangular area of sufficient cross-sectional size to permit the handle to slide through it yet hold it against turning sideways. The length of this housing is such that it will support the handle when the latter is in its extended operational position. The several parts composing the housing are welded together and the resulting assembly is welded to the horizontal leg of the roller mount.

Figure 4:
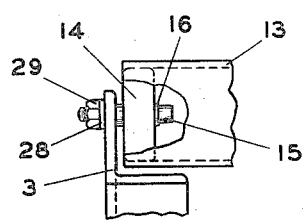
Figure 4 is an enlarged fragmentary front elevational view of the roller mounting arrangement.

The rollers consist of long, tubular sections 13 having a bearing 14 inserted in each end (Figure 4). A bolt 15 is inserted through the central opening of the bearing and the inner race 16 of the bearing is welded to the bolt. The bearing 14 with the threaded portion of the bolt projecting outwardly is welded to the walls of the tube. By this installation the rollers are enabled to turn freely with a minimum amount of effort even under heavy loads.

Figure 2:
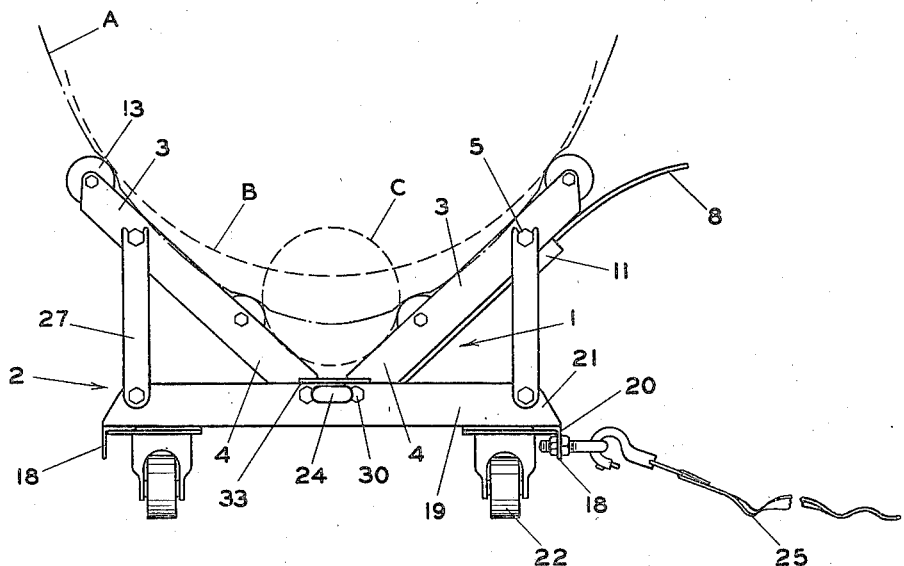
Figure 2 is a side elevational view of my invention showing the ramp in inoperative position.

The truck 2 has a rectangular frame 17 consisting of two longitudinal members 18 and two side members 19 welded together to form a rectangle. The frame members are made from L-shaped channel section with the vertical leg 20 of the longitudinal members projecting downwardly and the vertical leg 21 of the side members projecting upwardly (Figure 2). The purpose of this arrangement will appear more fully hereafter.

Horizontally rotatable casters 22 are welded or bolted to the frame 17 at each corner thereof. A shim plate 23 is inserted between each of the side members 19 and the casters to account for the thickness of the horizontal leg of the longitudinal frame members 18. These shim plates are welded to the casters 22 as well as to the side frame members 19.

The hooks 24 provide a convenient attachment for a pulling means such as a strap or cord when the display dolly is moved from one place to another. One is provided on each end and two on each side. They are attached to the frame 17 by welding or other suitable means, such as by tapping the frame member and threading the hooks into them.

Figure 5:
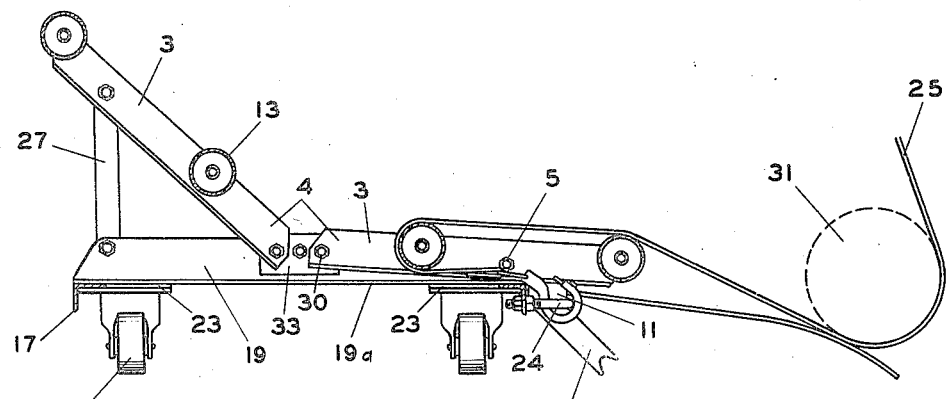
Figure 5 is a sectional view of my invention taken from a plane indicated by V—V of Figure 1 showing the loading ramp and loading strap in operative position.

A pair of cloth or leather straps 25 are mounted to the frame by removably attaching them to the hooks 24 mounted on the longitudinal frame members 18 (Figures 1, 2 and 5). The purpose of these straps will appear more fully hereinafter.

A pair of support bars 27 having a rectangular, or T-shaped, cross-section are provided for each pair of roller mounts. These support bars are pivotally mounted on their respective lower ends (when in operating position) to the side frame members 19 by bolts or rivets. The other end of the support bars is formed into a V-shaped, or U-shaped, notch.

Each of the various parts such as the frame members 18 and 19, the rollers 13, roller mounts 3, and support bars 27, and handles 8 may be made from any suitable material having sufficient strength characteristics. Preferably, however, they are fabricated from rolled steel sections.

The whole is of such size and arrangement that when assembled and in roll holding position, a standard 24 inch diameter roll of carpet is comfortably supported by the rollers only, as illustrated by the dash-dot line A in Figure 2, but larger or smaller rolls can, if desired, be conveniently handled, as shown by the broken lines B and C in Figure 2.

*Assembly*

Figure 3:
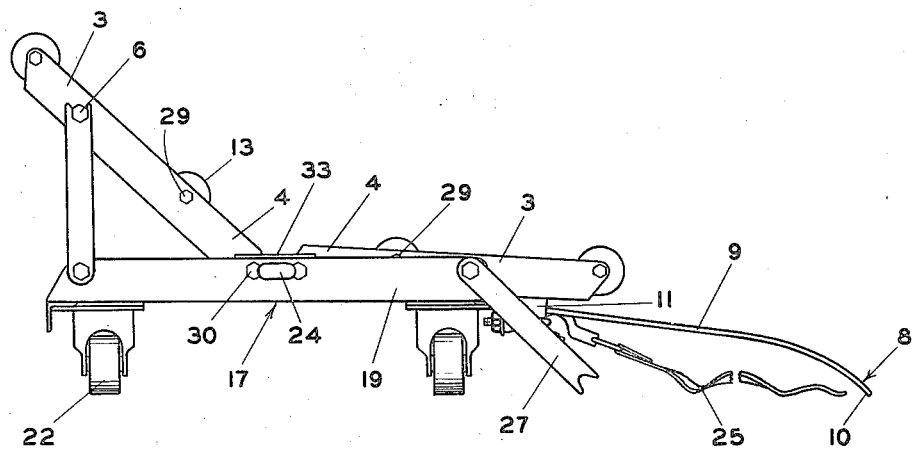
Figure 3 is a side elevational view of my invention showing the ramp in operative position.

The rollers 13 are mounted to the roller mounts 3 by passing the bolts 15 through suitable holes drilled in the vertical leg of the roller mounts and the washers 28 and nuts 29 installed (Figure 4). The roller and roller mount assemblies are then inserted between the side frame members 19, the spacers 33 placed in position, and the bolts 30, or rivets, inserted to mount the said assemblies pivotally to the said frame members. The mounting bolts 30 are spaced away on each side of the longitudinal centerline of the dolly a sufficient distance that the roller mounts may be rotated at least 45 degrees about the bolts without interfering with each other. The spacers are of sufficient thickness that the nuts 29 clear the said vertical flange of the respective end members 19 when the roller mount assemblies are lowered as shown in Figure 3.

The bosses 5 are removably secured in the V-shaped notches in the ends of the support bars and prevent the roller assembly from rotating downwardly about the bolts 30. The head 7 on each of the bosses 5 prevents the support bar from slipping off the end of the boss.

*Operation*

To load the dolly the handles 6 are pulled outwardly and the roller and roller mount assembly rotated upwardly sufficiently to lift the bosses 5 at each end thereof out of the notches in the upper ends of the support bars 27. After the bosses have been moved clear of these notches, the support bars are allowed to rotate downwardly until they touch the floor. The roller and roller mount assembly is then rotated downwardly until it rests on the horizontal flange 19a (Figure 5) of the two end members 19, the curved ends of the handles 10 touch the floor (Figure 3). The straps 25 are threaded under, around and over the innermost roller and outwardly over the outer roller and the ends laid along the floor (Figure 5). The cylindrical roll 31 of material, such as carpeting or linoleum, is then placed on the strap and the strap pulled up over it. As the free ends of the straps are pulled toward the dolly the roll of material 31 is caused to roll up the inclined ramp formed by the handles and onto the rollers 13. By means of the handles 8 the roller and roller mount assembly is then rotated upwardly and the bosses 5 seated in the notches of the support bars 27. The handles 8 are stored away by pushing them down through their housings until they rest on the inturned flanges of the angles 19.

The straps 25 may be left around the material roll, dropped back over the top supporting roller or removed altogether.

Once the material roll has been loaded as described the dolly may be moved about as desired either by pushing it or pulling it by a towing strap attached to the hooks 24. The material may be easily unrolled inasmuch as each of the rollers 13 are free to turn on their bearings 14.

Although roller and roller mount assemblies on both sides of the V are described as pivoted at their lower end and both may be rotated downwardly in the operation as described only one, in any ordinary particular loading operation, is actually lowered as a ramp while the other remains as a stop. The dolly may be easily modified to provide loading access on both sides by adding handles to the other roller and roller mount assembly.

Various other modifications of this described construction will be immediately apparent to persons acquainted with equipment of this type and accordingly the hereafter appended claims should be interpreted to cover such modifications and variations excepting as said claims by their own terms expressly require otherwise.

I claim:

1. A display dolly comprising: a truck including a frame and rotatable, floor engaging, supporting means; roller equipped material supports pivoted at one end to said truck and in one position inclined upwardly and outwardly from said truck and away from each other, and in the other position at least one of them positioned parallel to said truck frame; detachable means selectably holding said supports in said one position; handles on one of said supports extensible for forming inclined ramps.

2. A material display dolly comprising: a truck including a frame and rotatable, floor engaging, supporting means; material supporting rollers; mounts for said rollers pivotally attached on one end to said frame to form of said mounts in one position a V open at each of its ends and having its point of convergence at the frame and in another position to form a substantially horizontal loading platform; detachable means selectably holding said mounts in V forming position; handles slidably attached to one of said mounts adapted for forming a ramp when one side of said V is rotated downwardly.

3. A material display dolly comprising: a truck including a frame and rotatable, floor engaging, supporting means; at least two pairs of roller mounts pivotally attached at one end to said truck; roller mount supporting bars pivotally attached at one end to said frame and removably attached at the other end to said roller mounts; material supporting rollers held by said mounts; handles at each end of said rollers slidably attached to said roller mounts all so arranged and constructed that when said roller mounts are rotated downwardly the handles will act as material loading ramps.

4. A display dolly comprising: a truck including a rectangular, elongated, base frame and supporting casters; a pair of roller mounting frames therefor, which mounting frames are pivotally attached on their respective one ends to the short sides of said base frame on each side of the longitudinal centerline of said dolly and in loaded position the respective other ends are spaced further apart than the pivotally mounted ends; freely rotating rollers mounted to said roller mounting frames; selectably operable supports for said roller mounting frames; partially curved handles selectably and extendably attached to said roller mounting frames; said roller mounting frames and handles so arranged and constructed that in loading position at least one of said roller mounting frames and associated rollers may be rotated downwardly to rest on said base frame, whereby to form a substantially horizontal ramp, and said handles extended to form an inclined ramp.

5. A display dolly comprising: a truck including an elongated, rectangular base frame and supporting casters; a pair of normally upstanding roller mounting frames pivotally affixed to each end thereof at points on each side of the longitudinal centerline thereof; detachable supports for said roller mounting frames positioned for normally holding same in a V position but permitting either of same upon detachment of one of said supports to lie flat on the upper surface of said base frame; freely rotatable rollers affixed to and extending beyond the upper sides of said roller mounting frames; a plurality of partially curved handles and means affixing a pair of them extensibly to each of said roller mounting frames; whereby either pair of said roller mounting frames may be dropped onto the base frame and the handles extended to form a loading ramp.

6. A display dolly comprising: a truck including an elongated, rectangular, base frame and supporting casters; a pair of normally upstanding and diverging roller mounting frames affixed to each end thereof at points on each side of the longitudinal centerline thereof, the said frames on one side of said centerline being pivotally so affixed; detachable supports for said pivotally affixed roller mounting frames positioned for normally holding same in a V position with respect to the other roller mounting frames but permitting them upon detachment of said supports to lie flat on the upper surface of said base frame; freely rotatable rollers affixed to and extending beyond the upper sides of said roller mounting frames; a pair of partially curved handles and means affixing them extensibly to each of said pivotally mounted roller mounting frames; whereby said pair of roller mounting frames may be dropped onto the base frame and the handles extended to form a loading ramp.

LEWIS A. GEISTERT.

REFERENCES CITED

The following references are of record in the file of this patent:

UNITED STATES PATENTS

| Number | Name | Date |
| --- | --- | --- |
| 1,487,584 | McCarthy | Mar. 18, 1924 |
| 1,515,824 | Best | Nov. 18, 1924 |
| 1,597,592 | Galloway | Aug. 24, 1926 |
| 1,914,098 | Bean | June 13, 1933 |

FOREIGN PATENTS

| Number | Country | Date |
| --- | --- | --- |
| 667,814 | France | June 25, 1929 |